United States Patent
Vasseur et al.

(10) Patent No.: US 7,460,481 B2
(45) Date of Patent: Dec. 2, 2008

(54) INTER-DOMAIN TE-LSP WITH IGP EXTENSIONS

(75) Inventors: Jean-Philippe Vasseur, Dunstable, MA (US); Stefano B. Previdi, Rome (IT)

(73) Assignee: Cisco Technology, Inc., San Jose, CA (US)

(*) Notice: Subject to any disclaimer, the term of this patent is extended or adjusted under 35 U.S.C. 154(b) by 604 days.

(21) Appl. No.: 11/001,459

(22) Filed: Dec. 1, 2004

(65) Prior Publication Data

US 2006/0114916 A1  Jun. 1, 2006

(51) Int. Cl.
  *H04L 12/26* (2006.01)
(52) U.S. Cl. ............... 370/238; 370/392; 370/401
(58) Field of Classification Search .............. None
  See application file for complete search history.

(56) References Cited

U.S. PATENT DOCUMENTS

| | | | |
|---|---|---|---|
| 5,088,032 A | 2/1992 | Bosack | |
| 6,392,997 B1 | 5/2002 | Chen | |
| 6,473,421 B1 | 10/2002 | Tappan | |
| 6,483,833 B1 * | 11/2002 | Jagannath et al. | 370/392 |
| 6,538,416 B1 * | 3/2003 | Hahne et al. | 370/431 |
| 6,584,093 B1 | 6/2003 | Salama et al. | |
| 6,603,756 B1 | 8/2003 | Tappan | |
| 6,643,706 B1 | 11/2003 | Marques et al. | |
| 6,665,273 B1 | 12/2003 | Goguen et al. | |
| 7,120,120 B2 * | 10/2006 | Guerin et al. | 370/238 |
| 7,139,278 B2 * | 11/2006 | Gibson et al. | 370/401 |
| 7,302,494 B2 * | 11/2007 | Hayashi et al. | 709/239 |
| 2002/0087687 A1 | 7/2002 | Zaifman et al. | |
| 2004/0081154 A1 | 4/2004 | Kouvelas | |
| 2004/0184408 A1 | 9/2004 | Liu et al. | |
| 2004/0184441 A1 | 9/2004 | Wu et al. | |
| 2004/0215820 A1 | 10/2004 | Blair | |
| 2005/0094566 A1 * | 5/2005 | Hares | 370/238 |

OTHER PUBLICATIONS

International Application No. PCT/US05/41797, International Filing Date Nov. 17, 2005, Notification of Transmittal of the International Search Report, or the Declaration, Mailed Oct. 26, 2006, 6 pgs.
International Application No. PCT.US05/41797, International Filing Date Nov. 17, 2005, Written Opinion of the International Searching Authority, Mailed Oct. 26, 2006, 4 pgs.

(Continued)

*Primary Examiner*—Michael J Moore, Jr.
(74) *Attorney, Agent, or Firm*—Cesari and McKenna LLP

(57) ABSTRACT

A technique propagates reachability information for a tail-end node of a traffic engineering (TE) label switched path (LSP) to a head-end node of the TE-LSP in a computer network. The TE-LSP preferably spans multiple domains of the network such that the tail-end node resides in a domain that is different (remote) from the domain of the head-end node. The inter-domain information propagation technique employs an Interior Gateway Protocol (IGP) to transmit the remote reachability information from a target node residing in the same domain as the tail-end node to the head-end node. The head-end node uses the remote information to calculate routes, i.e., address prefixes and associated attributes, reachable from the tail-end node for insertion into its routing table.

19 Claims, 9 Drawing Sheets

OTHER PUBLICATIONS

Rekhter, Y., RFC 1771, entitled A Border Gateway Protocol 4 (BGP-4), Mar. 1995, pp. 1-54.

U.S. Appl. No. 10/767,574, filed Sep. 18, 2003, Vasseur et al, Computing Inter-Autonomous System MPLS Traffic Engineering LSP Paths.

U.S. Appl. No., filed Dec. 1, 2004, Propagation of Routing Information in RSVP-TE for Inter-Domain TE-LSPS.

Vasseur, J.P. et al., RSVP Path Computation Request and Reply Messages (draft-vasseur-mpls-computation-rsvp-05.txt), Internet Draft, Jul. 2004, pp. 1-31.

Callon, R., RFC 1195, entitled Use of OSI ISIS for routing in TCP/IP and Dual Environments, Dec. 1990, pp. 1-80.

Braden, R. et al., RFC 2205, entitled Resource ReSerVation Protocol (RSVP), Version 1 Functional Specification, Sep. 1997, pp. 1-112.

Moy, J., RFC 2328, entitled OSPF Version 2, Apr. 1998, pp. 1-183.

Awduche, D. et al., RFC 3209, entitled RSVP-TE: Extension to RSVP for LSP Tunnels Dec. 2001, pp. 1-43.

Katz, D. et al., RFC 3630, entitled Traffic Engineering (TE) Extensions to OSPF Version 2, Sep. 2003, pp. 1-14.

Smit, H., RFC 3784, entitled Intermediate-System-to-Intermediate-System (IS-IS) Extensions for Traffic Engineering (TE), Jun. 2004, pp. 1-13.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Perlman, Radia, Interconnections Second Edition: Bridges, Routers, Switches, and Internetworking Protocols, Addison Wesley, 1999.

Farrel, Adrian, Olddog Consulting, Jean-Philippe Vasseur, Cisco Systems, Inc., et al., "A Framework for Inter-Domain MPLS Traffic Engineering: draft-ietf-ccamp-inter-domain-framework-00.txt," IETF Standard-Working-Draft, Internet Engineering Task Force, IETF, CH, vol. ccamp, XP015016623, Aug. 2004, pp. 1-31.

Kompella, Kireeti, Juniper Networks and Yakov Rekhter, Juniper Networks, "LSP Hierarchy with Generalized MPLS TE:draft-ietf-mpls-lsp-hierarchy-08.txt," IETF Standard-Working-Draft, Internet Engineering Task Force, IETF, CH, vol. mpls, No. 8, XP015002741, Sep. 2002, pp. 1-26.

Supplementary European Search Report, European Application No.: 05847838.9 / 1817881, PCT/US2005041797, Applicant: Cisco Technology, Inc., Date of Mailing: Jul. 31, 2008, pp. 1-8.

\* cited by examiner

INTER-DOMAIN TE-LSP WITH IGP EXTENSIONS

RELATED APPLICATION

This application is related to U.S. application Ser. No. 11/001,349, entitled PROPAGATION OF ROUTING INFORMATION IN RSVP-TE FOR INTER-DOMAIN TE-LSPS, filed by Vasseur et al. on even date herewith, the contents of which is hereby incorporated in its entirety.

BACKGROUND OF THE INVENTION

1. Field of the Invention

The present invention relates to computer networks and more particularly to retrieving reachability information across domains of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an AS or, more particularly, an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4* (BGP-4), published March 1995.

Examples of an intradomain routing protocol, or an interior gateway protocol (IGP), are the Open Shortest Path First (OSPF) routing protocol and the Intermediate-System-to-Intermediate-System (ISIS) routing protocol. The OSPF and ISIS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version* 2, dated April 1998 and the ISIS protocol used in the context of IP is described in RFC 1195, entitled *Use of OSI ISIS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, availability of backup bypass tunnels for each link and node included in the path, etc. Path computation can either be performed by the head-end LSR or by some other entity operating as a path computation element (PCE). The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., IGP area or level, or may also span multiple domains, e.g., IGP areas or levels.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas. Neither the head-end LSR nor any single PCE will have sufficient knowledge to compute a path. Because of this, MPLS Traffic Engineering path computation techniques are required to compute inter-domain TE-LSPs.

The use of PCEs has been adapted to create a distributed PCE architecture, in order to extend MPLS TE-LSPs across domain boundaries. An example of such a distributed architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes).

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

Occasionally, a head-end LSR or node will have multiple TE-LSPs into a particular domain (e.g., area or level) outside of its own domain (i.e., remote). These interdomain TE-LSPs may terminate at either a single tail-end LSR or node of the remote domain, or at different tail-end nodes within the same remote domain, depending upon their initial setup. A known limitation of such inter-domain TE-LSPs lies in the inability to automatically steer traffic onto such TE-LSPs when attempting to reach nodes or prefixes contained within the domain of the tail-end node. This limitation is primarily due to limited network topology information available to the head-end node. Currently, this lack of reachability information has required the use of static or policy-based routing, which generally requires manual configuration by a system administrator with prior knowledge of the network topology. Such alternatives can be cumbersome and limited in their applicability, and in some cases (e.g., misconfiguration) can be the cause of network failure.

SUMMARY OF THE INVENTION

The present invention is directed to a technique for propagating reachability information for a tail-end node of a traffic engineering (TE) label switched path (LSP) to a head-end node of the TE-LSP in a computer network. The TE-LSP preferably spans multiple domains of the network such that the tail-end node resides in a domain that is different (remote) from the domain of the head-end node. The inter-domain information propagation technique employs an Interior Gateway Protocol (IGP) to transmit the remote reachability information from a target node residing in the same domain as the tail-end node to the head-end node. The head-end node uses the remote information to calculate routes, i.e., address prefixes and associated attributes, reachable from the tail-end node for insertion into its routing table.

In the illustrative embodiment described herein, the TE-LSP is established using Resource ReSerVation Protocol (RSVP) TE signaling messages. The head-end node inserts a reference (label) to the established TE-LSP into its routing table with an assigned metric as discovered by the RSVP TE signaling messages. The target node propagates ("advertises") the remote reachability information related to the tail-end node of the TE-LSP by means of IGP messages transmitted across domains, e.g., IGP areas/levels. The target node is illustratively embodied as an area border router or a level 1/level 2 router and the IGP messages are embodied as Open Shortest Path First (OSPF) or Intermediate-System-to-Intermediate-System (IS-IS) advertisement messages ("IGP advertisements"), respectively. Notably, the IGP advertisements include type/length/value (TLV) encoded formats used to convey the remote reachability information.

In accordance with one aspect of the present invention, the target node advertises all reachable address prefixes in its domain using a novel area-identifier (area-id) sub-TLV that identifies the domain to which each prefix belongs. The area-id sub-TLV is contained within an extended reachability TLV of the IGP advertisement that is transmitted to IGP nodes across the domains. Upon receiving the advertisement with the area-id sub-TLV, the head-end node calculates routes using its local reachability information, as well as the remote reachability information from the target node to create inter-domain reachability information. The area-id of each prefix is used to determine which of the prefixes are reachable through a particular TE-LSP. In this way, prefixes that have the same area-id as a tail-end node are routed through the TE-LSP to that tail-end node. The head-end node assigns a metric (e.g., cost) to each prefix obtained via the remote reachability information equal to, or approximately equal to, the metric of the TE-LSP, as discovered by the RSVP TE signaling messages.

In accordance with another aspect of the present invention, the target node is located along the TE-LSP and advertises all reachable address prefixes that are "downstream" from the tail-end (from the target node perspective) in its domain using a novel node-id sub-TLV that identifies the tail-end node as originating the prefixes. The node-id sub-TLV is contained within the extended reachability TLV of the IGP advertisement that is transmitted to IGP nodes across the domains in response to, e.g., pre-configuration of the target node or extensions to the RSVP-TE signaling messages. As for the latter, the RSVP extensions may specify both the target node and an access control list that limits the propagated information to downstream prefixes. Upon receiving the advertisement with the node-id sub-TLV, the head-end node calculates routes using its local reachability information, as well as the remote reachability information from the target node to create inter-domain reachability information. Prefixes that have been identified as "downstream" to a tail-end node are routed through the TE-LSP to that tail-end node. The head-end node assigns a metric to each address prefix obtained via the remote reachability information equal to the metric of the TE-LSP, as discovered by the RSVP TE signaling messages.

In accordance with still another aspect of the present invention, the target node is located along the TE-LSP and advertises all reachable address prefixes in its domain from the tail-end node using the node-id sub-TLV along with a novel prefix-cost sub-TLV. Here, the prefix-cost sub-TLV contains a metric (e.g., cost) of each prefix from the tail-end node (identified by the node-id sub-TLV) as computed by a node that does not originate the prefix, i.e., the target node. The prefix-cost sub-TLV is illustratively employed where the target node performs a special SPF computation rooted at the tail-end node to create a special SPT. The prefix-cost sub-TLV is contained within the extended reachability TLV of the IGP advertisement that is transmitted to IGP nodes across the domains in response to, e.g., pre-configuration of the target node or extensions to the RSVP-TE signaling messages. Upon receiving this advertisement, the head-end node calculates routes using its local reachability information, as well as the remote reachability information from the target node to create inter-domain reachability information. Specifically, for each address prefix obtained via the IGP advertisement with the node-id and prefix-cost sub-TLVs, the head-end node assigns a metric to the prefix equal to the metric carried in the prefix-cost sub-TLV (in addition to the TE-LSP metric).

Advantageously, the novel technique propagates reachability information for a tail-end node of an established TE-LSP that spans multiple domains to a head-end node of the TE-LSP. By informing the head-end node of the reachability information for the tail-end node, the inventive technique provides an alternative to sub-optimal routing techniques, such as cumbersome manual configuration (e.g., static routing or policy routing), that can avoid some of the risks and possible errors created in such sub-optimal routing techniques.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
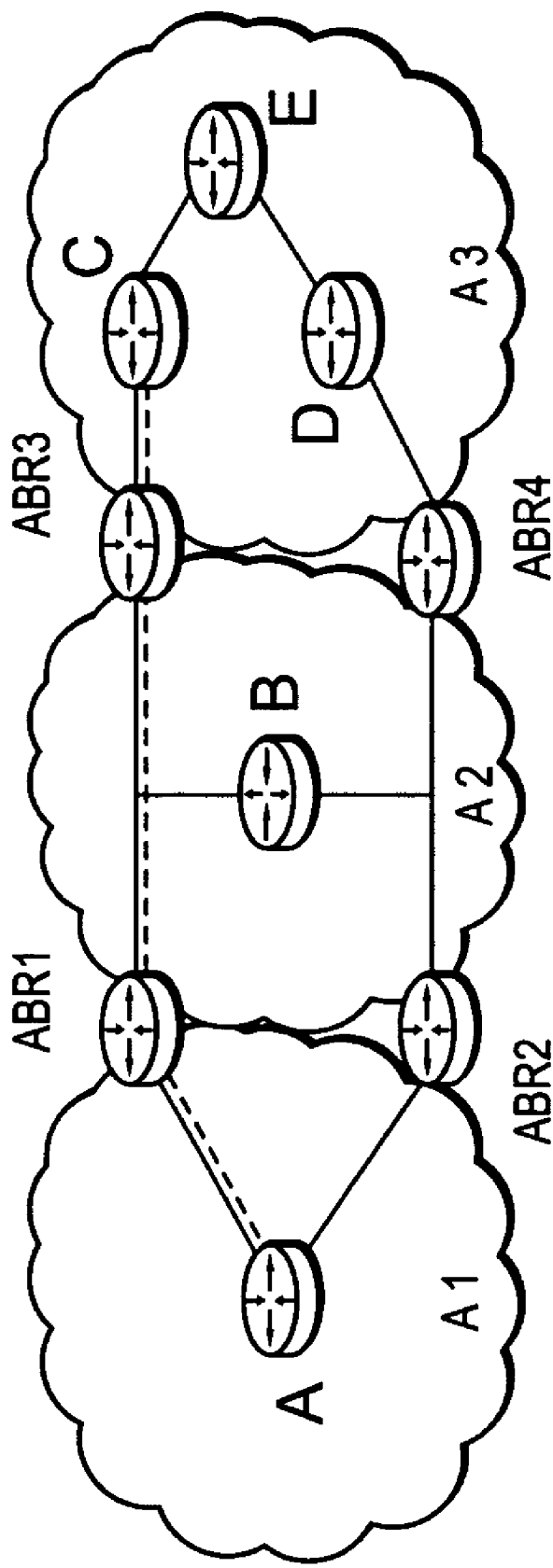
FIG. 1 is a schematic block diagram of an exemplary computer network of areas that may be used in accordance with the present invention.

FIG. 1 is a schematic block diagram of an exemplary computer network 100 comprising areas A1 and A2 having exemplary intradomain routers A and B, respectively, and area A3, which has exemplary intradomain routers C, D, and E. In addition, A1 and A2 share area border routers ABR1 and ABR2, while A2 and A3 share ABR3 and ABR4. As used herein, an area is a collection of routers that share full network topology information with each other but not necessarily with routers outside the area. A collection of areas may be contained within a single autonomous system (AS). The term area as used herein also encompasses the term "level" which has a similar meaning for networks that employ IS-IS as their interior gateway protocol (IGP), in which case the area border routers ABR1-4 are embodied as level 1/level 2 (L1L2) routers. These examples are merely representative. The terms area and level are used interchangeably herein, as well as the use of ABR, L1L2 routers, and more generally, IGP nodes.

Data packets may be exchanged among the areas A1-A3 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the areas using predetermined IGPs, such as conventional distance-vector protocols or, illustratively, link-state protocols, through the use of link-state advertisements or link-state packets ("IGP Advertisements").

Figure 2:
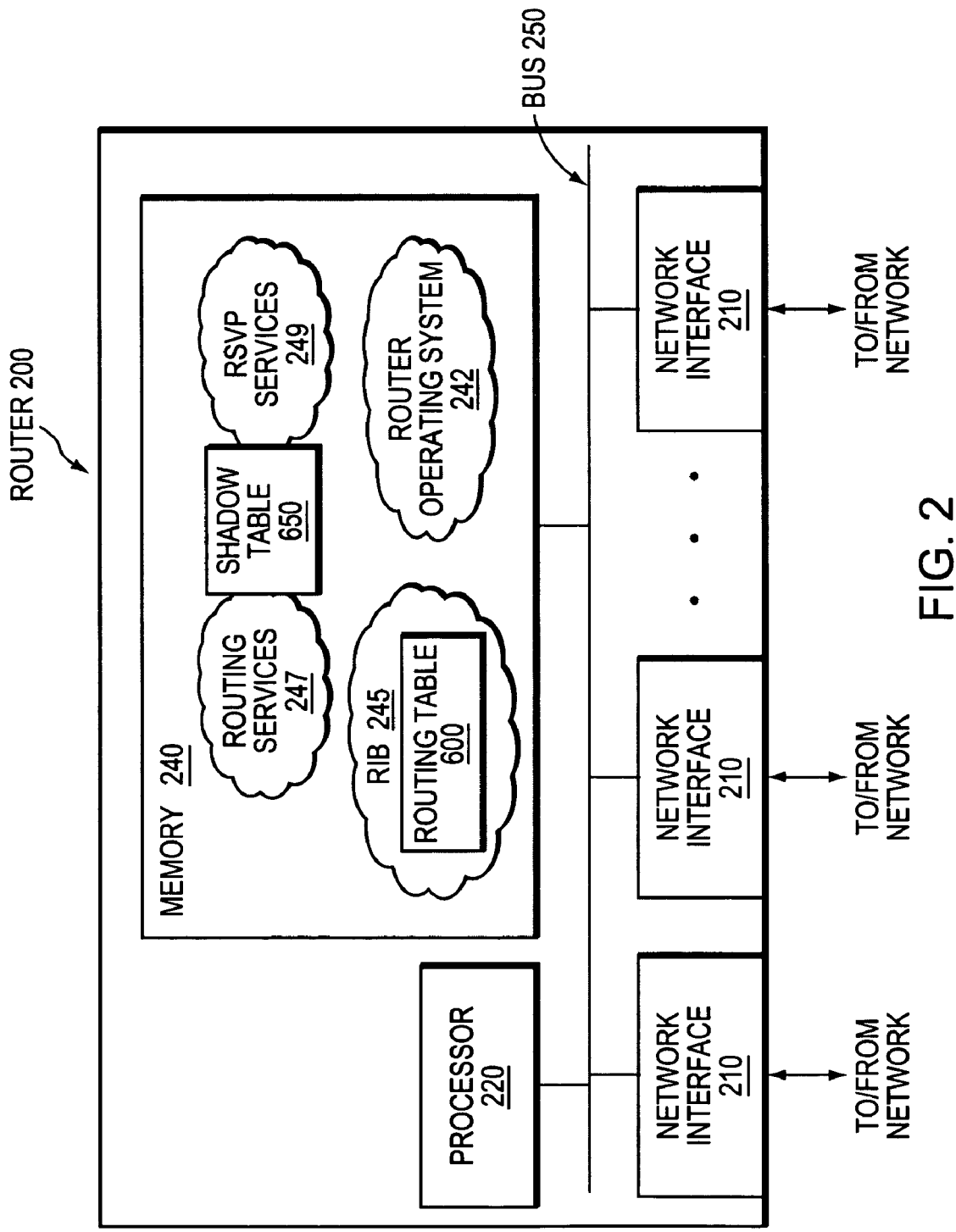
FIG. 2 is schematic block diagram of an exemplary router that may be advantageously used with the present invention.

FIG. 2 is a schematic block diagram of an exemplary router 200 that may be advantageously used with the present invention as an IGP node (e.g., an intradomain router or a border router). The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 600 and shadow table 650. A router operating system 242, portions of which are typically resident in memory 240 and executed by the processor, functionally organizes the router by, inter alia, invoking network operations in support of software processes and/or services executing on the router. These software processes and/or services include Routing Information Base (RIB) 245, Traffic Engineering (TE) module 246, routing services 247, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF and IS-IS. These functions may be configured to manage a forwarding information database (not shown) containing, e.g., data used to make forwarding decisions. RSVP services 249 contain computer executable instructions for implementing RSVP and processing RSVP messages in accordance with the present invention. RSVP is described in R. Braden, et al., *Resource ReSerVation Protocol (RSVP)*, Request For Comments (RFC) 2205, September 1997, available from the IETF and which is hereby incorporated by reference as though fully set forth herein, and in RFC 3209, entitled RSVP-TE: *Extensions to RSVP for LSP Tunnels*, as incorporated above.

Changes in the network topology may be communicated among routers 200 using a link-state protocol, such as the conventional OSPF and IS-IS protocols. Suppose, for example, that a communication link fails within an AS or a cost value associated with a network node changes. Once the change in the network's state is detected by one of the routers, that router may flood an IGP Advertisement communicating the change to the other routers in the AS. In this manner, each of the routers eventually "converges" to an identical view of the network topology.

Figure 3:
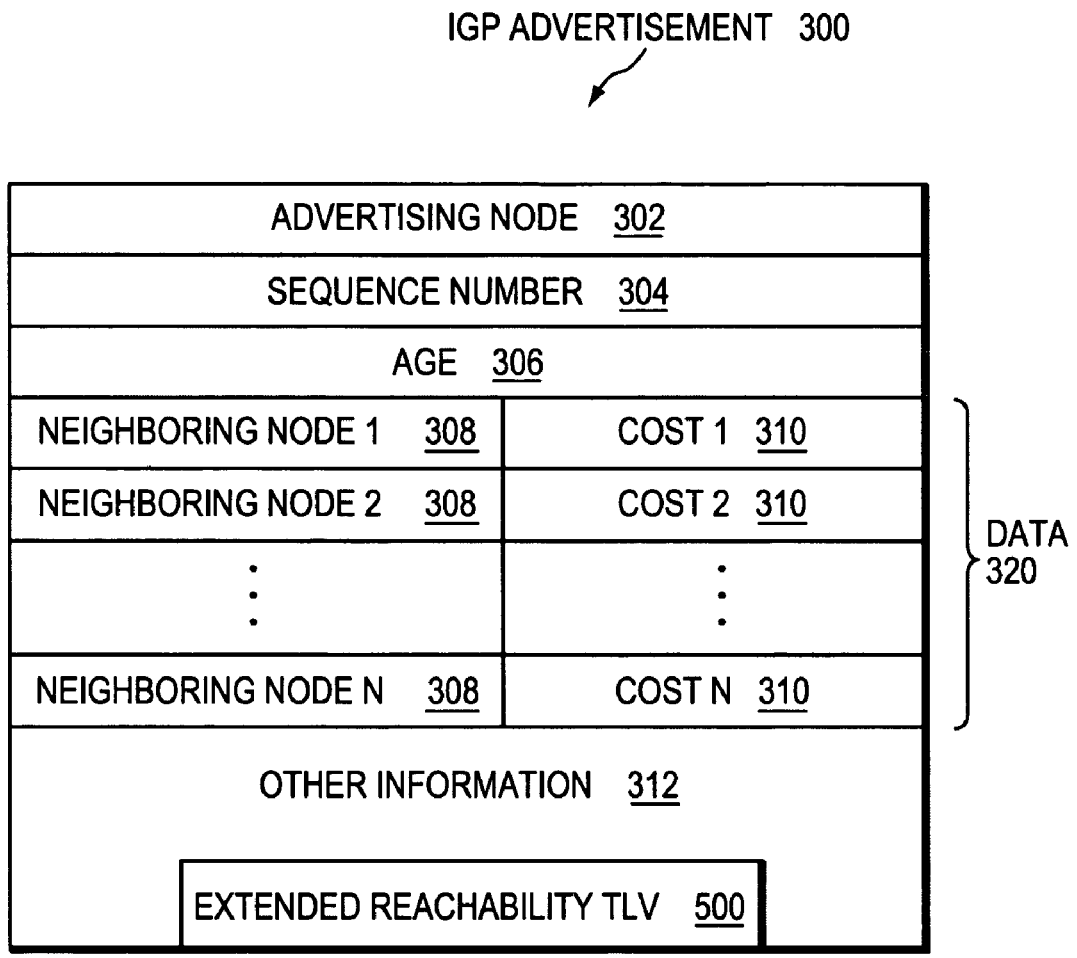
FIG. 3 is a schematic block diagram of an exemplary IGP Advertisement that may be flooded by the routers.

FIG. 3 illustrates an exemplary IGP Advertisement 300 that may be flooded by the routers 200. The packet includes an advertising-node field 302, a sequence-number field 304, an age field 306, a data section 320, and other routing information 312. The advertising-node field 302 stores a value that identifies the router that generated and originally broadcast the IGP Advertisement 300. The sequence-number field 304 stores a sequence number indicating the relative version of the IGP Advertisement. Typically, the sequence number stored in the field 304 is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number.

The age field 306 also stores a value that may be used for determining whether the IGP Advertisement 300 is valid. The age value is typically initialized to a non-zero integer value, often in units of seconds. The age value may be decremented, e.g., by one every second, until the age value reaches zero, thereby indicating that the IGP Advertisement has become invalid. That is, every router 200 that stores or floods the IGP Advertisement 300 continuously ages the packet until the age value equals zero. Those skilled in the art will appreciate that other aging mechanisms alternatively may be used, such as incrementing the IGP Advertisement age value from an initial value, e.g., equal to zero, until the age value reaches a known upper limit.

The data section 320 includes one or more pairs of neighboring-node fields 308 and cost fields 310. Each neighboring-node field 308 stores a value, such as an address, indicating a network node that is directly accessible from the intermediate node stored in the advertising-node field 302. The field 310 stores a cost value that has been associated, e.g., by the advertising node, with the network node identified in the neighboring-node field 308. As shown, each neighboring-node field 308 is associated with only one corresponding cost field 310. However, it is noted that in other embodiments, a single neighboring node may be associated with a plurality of cost values. Other routing information 312 may also be included in the IGP Advertisement 300, such as checksum values, packet-length information, flag values, type-of-service metrics, etc., and/or a novel IGP Extension Object 500 (described further below). Generally, the received IGP Advertisements are stored in a Link-State Database (LSDB) of the router 200 (not shown).

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs). An example TE-LSP is shown as a dotted line between a head-end node (A) and a tail-end node (C) in FIG. 1. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol, and in particular, RSVP TE signaling messages.

Figure 4:
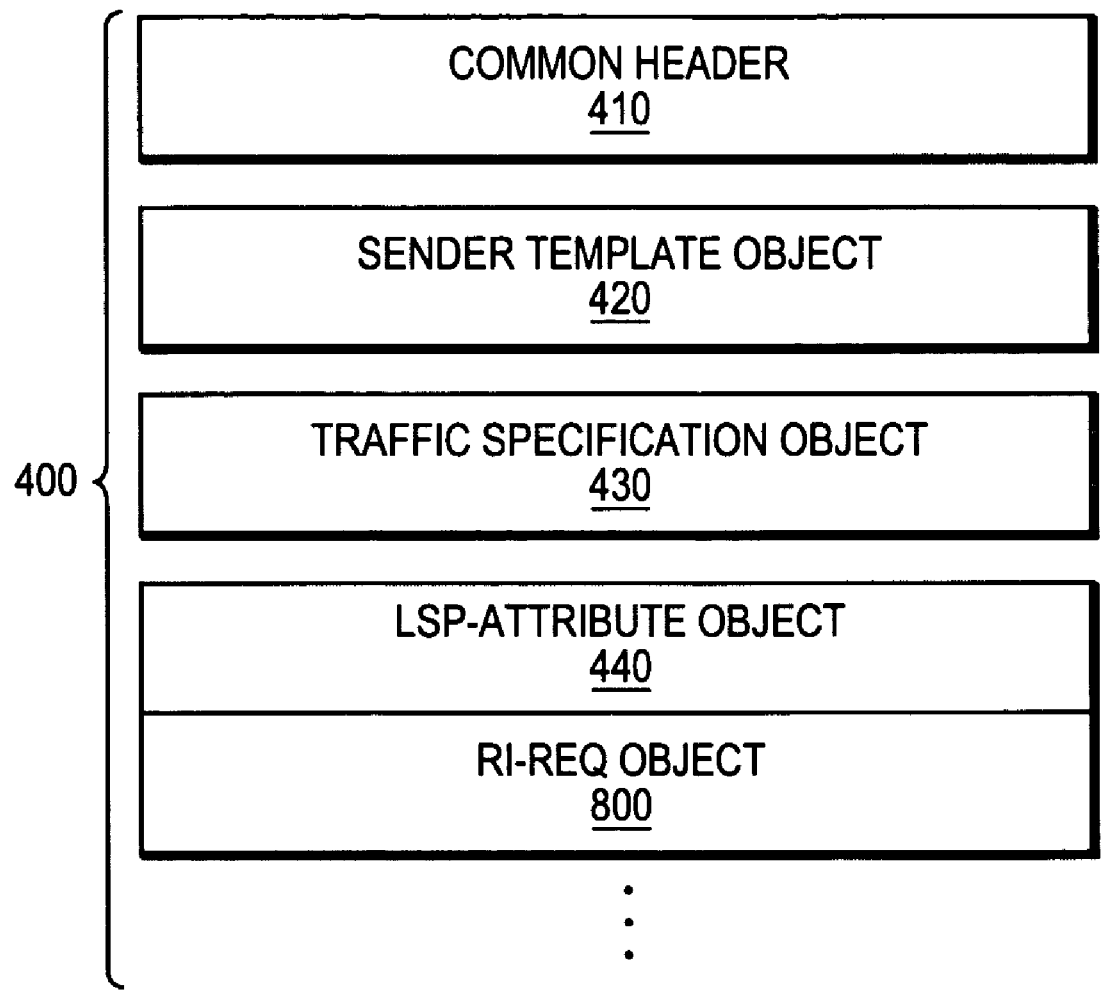
FIG. 4 is a schematic block diagram of portions of an RSVP Path message that may be advantageously used with the present invention.

In accordance with RSVP, to establish a TE-LSP (data flow) between a sender (e.g., head-end node A) and a receiver (e.g., tail-end node C), the sender may send an RSVP path (Path) message downstream hop-by-hop along a path (e.g., a unicast route) to the receiver to identify the sender and indicate e.g., bandwidth needed to accommodate the data flow, along with other attributes of the TE-LSP. The Path message may contain various information about the data flow including, e.g., traffic characteristics of the data flow. FIG. 4 is a schematic block diagram of portions of an RSVP Path message 400 that may be advantageously used with the present invention. Message 400 contains, inter alia, a common header 410, a sender template object 420, a traffic specification (Tspec) object 430 and an LSP-Attribute object 440. It should be noted that message 400 may contain other objects including a novel Routing Information Request (RI-REQ) object 800 (described further below). To establish a data flow between a receiver and a sender, the receiver may return an RSVP Reserve (Resv) message (not shown) upstream along the path to the sender to confirm the attributes of the TE-LSP, and provide a TE-LSP label. It should be noted that the state of the RSVP is refreshed on a timed interval, e.g., every thirty seconds, in which RSVP Path and Resv messages are exchanged. This timed interval is configurable by a system administrator.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To compute paths across multiple domains, previously incorporated U.S. application Ser. No. 10/767,574 describes the use of a virtual shortest path tree (VSPT) algorithm in a distributed path computation element (PCE) architecture. Notably, it will be apparent to those skilled in the art that other methods may be used to compute the TELSPs (e.g., loose hops, explicit paths, etc.), and such methods are within the scope of the present invention. Furthermore, the path computation request (and response) can be implemented in accordance with a protocol specified in Vasseur, et al. *RSVP Path Computation Request and Reply Messages*, Internet Draft, July 2004, which is hereby incorporated by reference as though fully set forth herein.

The present invention is directed to a technique for propagating reachability information for a tail-end node of a traffic engineering (TE) label switched path (LSP) to a head-end node of the TE-LSP in a computer network. The TE-LSP preferably spans multiple domains of the network such that the tail-end node resides in a domain that is different (remote) from the domain of the head-end node. The inter-domain information propagation technique employs an Interior Gateway Protocol (IGP) to transmit the remote reachability information from a target node residing in the same domain as the tail-end node to the head-end node. The head-end node uses the remote information to calculate routes, i.e., address prefixes and associated attributes, reachable from the tail-end node for insertion into its routing table.

In the illustrative embodiment described herein, the TE-LSP is computed and established using RSVP TE signaling messages in accordance with known explicit path (user configurable) and/or PCE technologies. In particular, RSVP services 249 employs such signaling and techniques to compute one or more metrics (e.g., costs) associated with the established TE-LSP. A reference (label) to the TE-LSP, as well as the computed metric, are then stored in shadow table 650, as described herein. The head-end node thereafter inserts the TE-LSP reference into its routing table with an assigned metric as discovered by the RSVP TE signaling messages. The target node propagates ("advertises") the remote reachability information related to the tail-end node of the TE-LSP by means of IGP messages transmitted across domains, e.g., IGP areas/levels. The target node is illustratively embodied as an area border router or a level 1/level 2 router and the IGP messages are embodied as OSPF or IS-IS advertisement messages ("IGP advertisements"), respectively. Notably, the IGP advertisements include type/length/value (TLV) encoded formats used to convey the remote reachability information.

The TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 5:
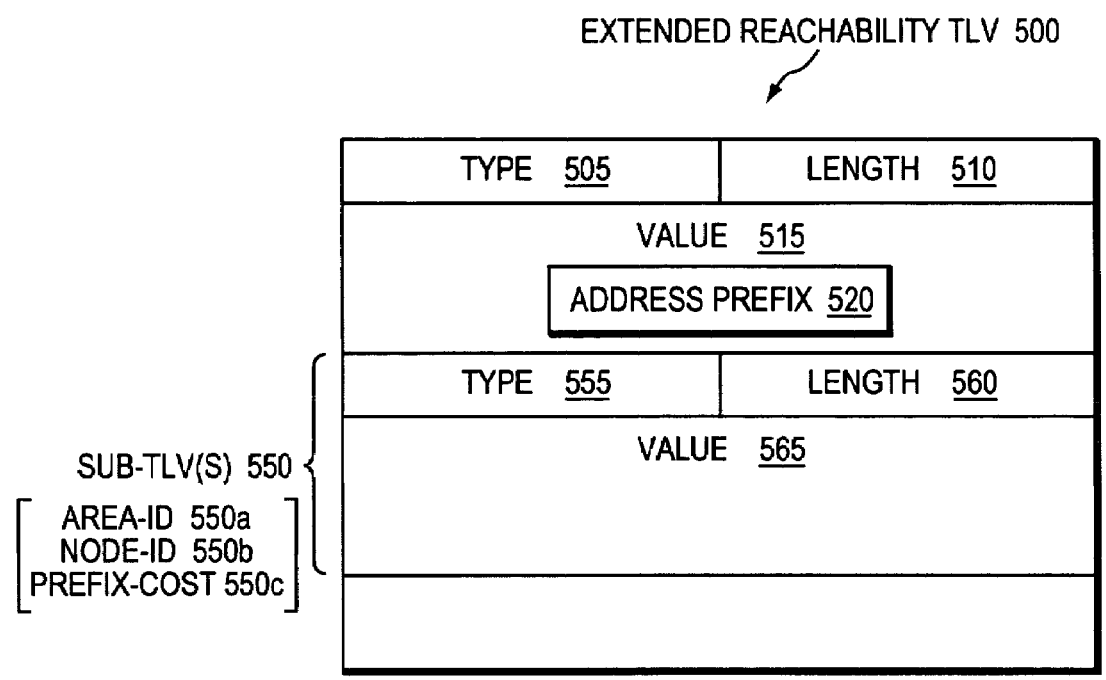
FIG. 5 is a schematic block diagram illustrating the format of an IGP Extended TLV that may be advantageously used with the present invention.

FIG. 5 is a schematic block diagram illustrating the format of an IGP Extended Object 500 that may be advantageously used with the present invention. The IGP Extended Object 500 is illustratively embodied as a TLV contained in an IGP advertisement 300 and is extended to carry an address prefix reachable from a particular IGP node. To that end, the "extended reachability TLV" 500 is organized to include a Type field 505 containing a predetermined type value (e.g., a "type 135" or "extended IP reachability" TLV), as defined in above-referenced RFC 3784. The Length field 510 is a variable length value. The Value field 515 illustratively contains, inter alia, the reachable address prefix 520, along with one ore more sub-TLVs 550, each having a Type field 555, Length field 560, and Value field 565. The fields of the sub-TLV(s) 550 are used in a variety of manners, including as described herein, according to the present invention.

In accordance with one aspect of the present invention, the IGP (target) node advertises all reachable address prefixes in its domain using a novel area-identifier (area-id) sub-TLV 550a that identifies the domain to which each prefix belongs. The area-id sub-TLV 550a is contained within the extended reachability TLV 500 of an IGP advertisement 300 that is transmitted to IGP nodes across the domains. Specifically, the area-id sub-TLV is used to convey the area (level) identifier of the router (prefix). Each area/level must have a predefined and unique area-id, and each prefix advertised by the target node within an area/level has the same area-id sub-TLV. Notably, prefix attributes, such as the area-id sub-TLV 550a, are preserved by the target node (e.g., a border routers, such as ABRs or L1L2 routers), when propagating prefixes across areas or levels.

Upon receiving the advertisement 300 with the area-id sub-TLV 550a, the head-end node calculates routes using its local reachability information, as well as the remote reachability information from the target node to create inter-domain reachability information. The area-id of each prefix is used to determine which of the prefixes are reachable through a particular TE-LSP. In this way, prefixes that have the same area-id as a tail-end node are routed through the TE-LSP to that tail-end node. The head-end node assigns a metric (e.g., cost) to each prefix obtained via the remote reachability information equal to, or approximately equal to, the metric of the TE-LSP, as discovered by the RSVP TE signaling messages. More specifically, the head-end node loads the remote reachability information into the shadow table 650 prior to inserting that resulting information into its routing table 600.

Figure 6:
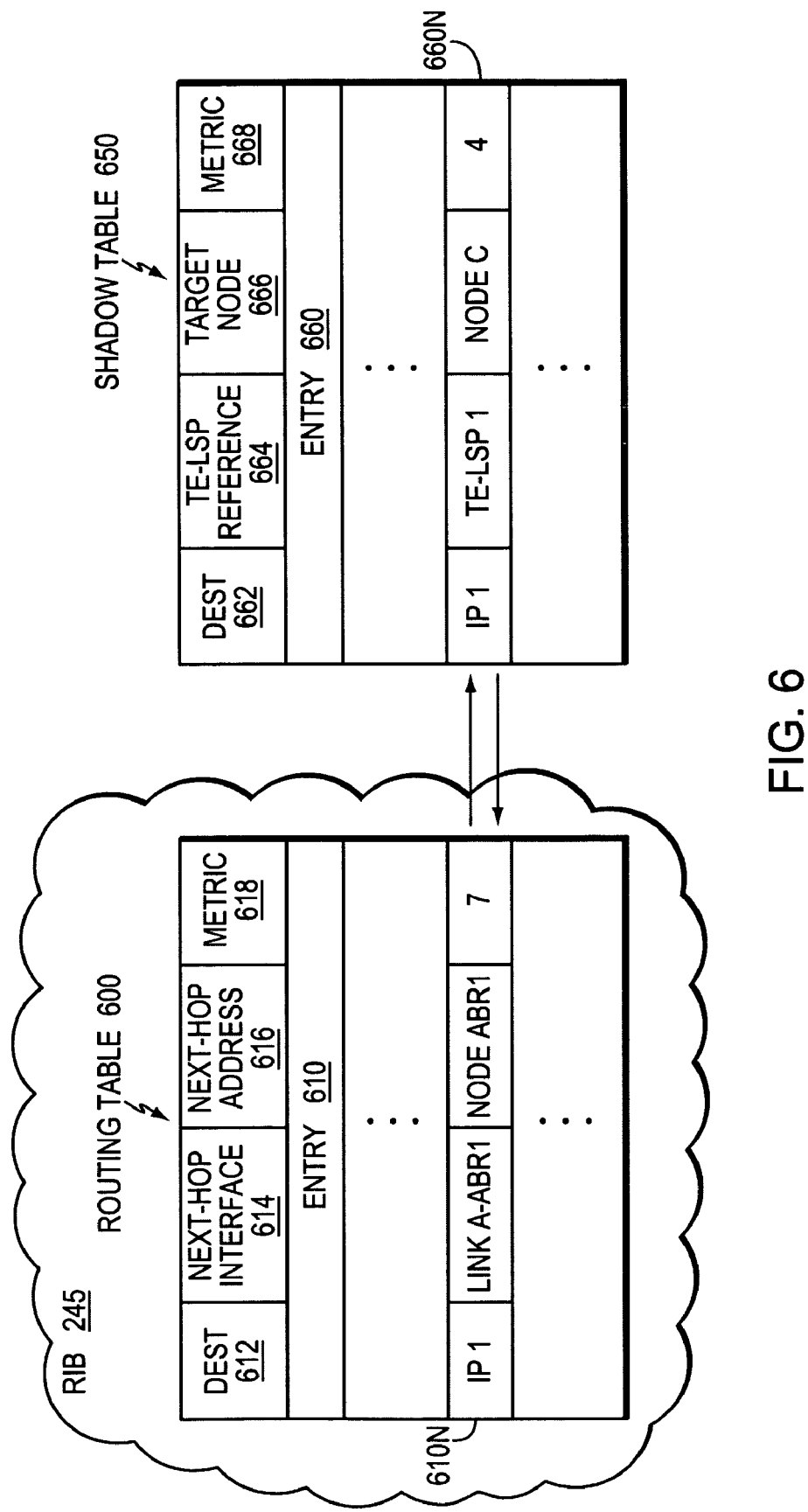
FIG. 6 is schematic block diagram of an exemplary routing table that may be advantageously used with the present invention.

FIG. 6 is schematic block diagram of exemplary routing table 600 that may be advantageously used with the present invention. Routing table 600 is illustratively stored in memory 240 and includes one or more entries 610, each comprising a plurality of fields for storing a reachable destination address 612, a next-hop interface 614 and next-hop address 616 to reach that destination, and an associated metric (e.g., cost) 618 of reaching the destination. The routing table 600 is illustratively maintained and managed by RIB 245. To that end, the RIB 245 maintains copies of routes (paths) provided by the routing protocols, such as IGP, in order to compute best paths/routes for installation into the routing table 600.

For example, assume that a destination address prefix IP1 is reachable from node A via node C. In addition, the cost of the path A-C connecting node A to node C is "6" (such as via ABR1 and ABR3 of FIG. 1), and the cost of the link C-N to the reachable address IP1 is "1." A destination address field 612 of entry 610N contains the reachable address IP1, and the next-hop fields 614, 616, are populated with, e.g., link A-ABR1 and a loopback address of node ABR1, respectively. Note that a loopback address of the next hop node is used as the next-hop address for many reasons, including as a way to avoid depending upon the availability of network interfaces of that node. The cost of IP1 is the cost of all links to the reachable address, i.e., "7."

Associated with IP1 of entry 610N is a shadow table 650. As noted, the shadow table 650 is initially created by RSVP services 247, using the TE-LSP information obtained from RSVP signaling messages. However, according to the invention, (IGP) routing services 247 (and, illustratively IS-IS) cooperating with RSVP services 249 to populate certain fields of the shadow table 650 with the remote reachability information obtained from the target node. The shadow table 650 essentially comprises the same format as routing table 600, but with destination address prefixes reachable via the target node of the TE-LSP. Specifically, each entry 660 of the shadow table 650 may include a plurality of fields for storing a destination prefix 662 reachable from the target node, a reference to the TE-LSP 664 of the target node, the address of the target node 666, and a cost metric 668 from the head-end node to the reachable prefix. For this aspect of the present invention, the shadow table 650 stores a metric 668 equal to the TE-LSP (TE-LSP 1). Yet, as a result of loading the remote reachability information into the shadow table, each prefix is associated with a target (tail-end) node having matching area-ids. Illustratively, cost metric 668 is the cost of a TE-LSP between node A and C, e.g., "4." Notably, the cost metric for the TE-LSP may be greater than, less than, or equal to the cost of the IP routing links, and that the values "5" and "7" respectively should be taken as examples.

According to the invention, the IGP/RSVP services cooperate with the RIB 245 to merge the contents of a shadow table entry 660N with a respective routing table entry 610N when the reachable destination addresses match. In order for the routing table insertion to work properly, it is required that the head-end node apply a timer before updating its routing table in order for the remote reachability information (prefix) to be loaded into the shadow table 650. As a result of the merge, the associated attributes of the routing table entry 610N are updated to reflect attributes reachable by the target node. For example, the entry 610N of the routing table 600 is updated such that the next-hop interface field 614 contains the TE-LSP reference from entry 664, the next-hop address field 616 contains node C from field 666, and the metric field 618 contains the cost of the TE-LSP (e.g., the value "4") from field 668.

The updated routing table 600 thus contains prefixes reachable from the TE-LSP, such that traffic may be routed to those prefixes along the TE-LSP. Notably, the head-end node dynamically calculates these routes, such as when updated routing information is received, as described above. Also, in one aspect of the present invention, the updated routing information triggers a partial route calculation (PRC) (such as in the case of ISIS) and not a full SPF.

In the event the TE-LSP becomes unavailable (e.g., manually removed or a TE-LSP failure), the merged prefixes and associated attributes from the shadow table 650 are removed from the routing table 600. In one aspect of the present invention, the prefixes are removed after the TE-LSP has not been restored before the expiration of a predetermined timer. Also, in another aspect of the present invention, a wait-to-restore (WTR) timer may be advantageously used before re-associating prefixes to a restored TE-LSP, in order to avoid multiple traffic disruptions in case of resource flapping.

Figure 7:
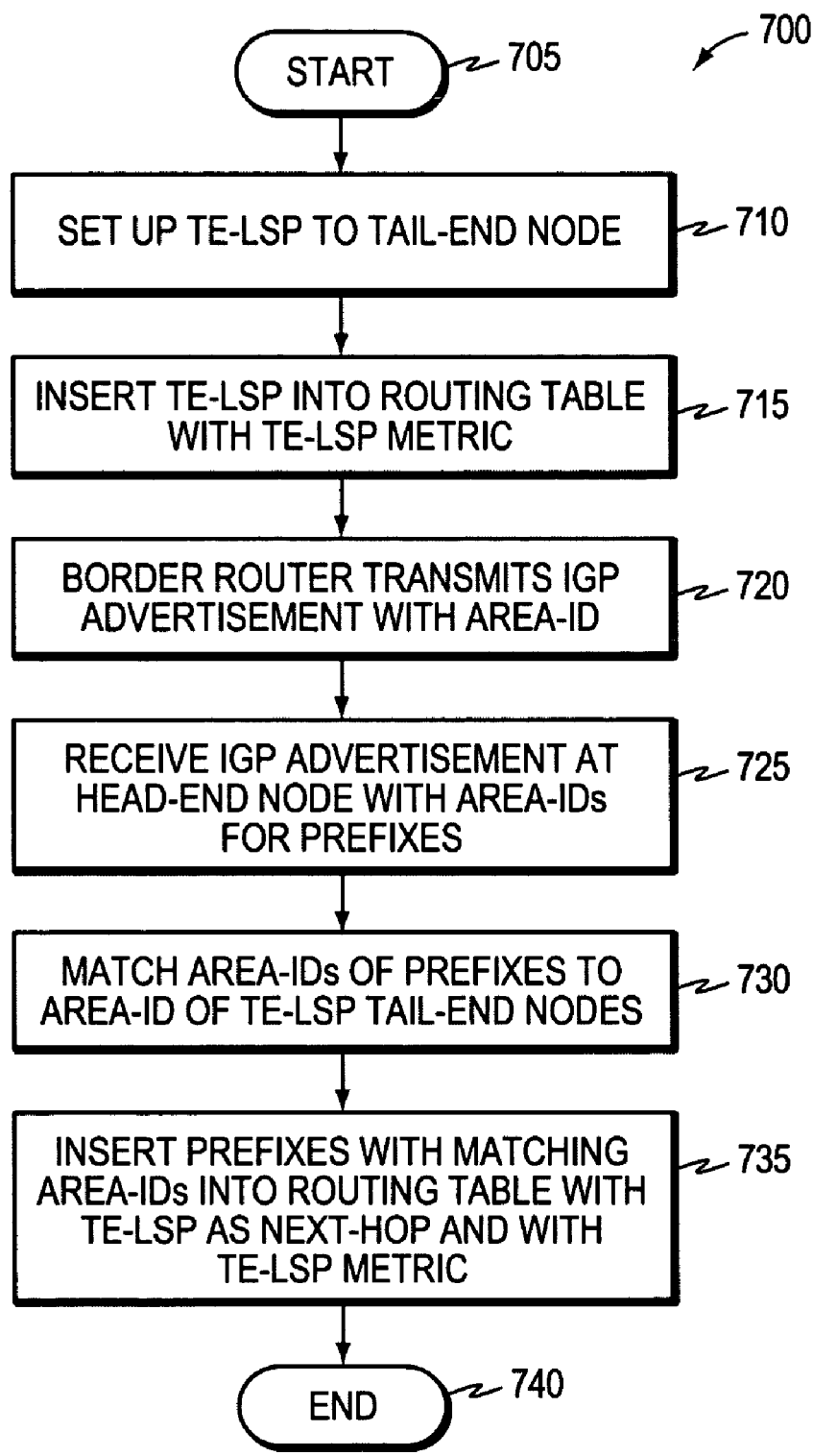
FIG. 7 is a flowchart illustrating a sequence of steps for propagating reachability information in accordance with the present invention.

FIG. 7 is a flowchart illustrating a sequence of steps for propagating reachability information in accordance with the present invention. The sequence 700 starts at step 705, and continues to step 710, where a TE-LSP is established (set up) from a head-end node to a tail-end node in accordance with the methods described above. In step 715, the head-end node inserts the TE-LSP into its routing table with a metric learned through RSVP TE. A target node (e.g., a border router, such as an ABR or L1L2 router), transmits an IGP Advertisement in step 720 with the novel area-id TLV 550a. Upon receiving the IGP Advertisement in step 725, the head-end node loads the area-id contents into the shadow table and examines those contents to match the area-ids of the advertised prefixes to the area-id of known TE-LSP tail-end nodes in step 730. In step 735, the head-end inserts the prefixes with matching area-ids into its routing table 600. In this case, the prefixes are given a next-hop as the TE-LSP and a metric equal to (or substantially equal to) the TE-LSP metric. The sequence ends in step 740.

In accordance with another aspect of the present invention, the target node is located along the TE-LSP and advertises all reachable address prefixes that are "down-stream" from the tail-end (from the target node perspective) in its domain using a novel node-id sub-TLV 550b that identifies the tail-end node as originating the prefixes. The node-id sub-TLV 550b is contained within the extended reachability TLV 500 of the IGP advertisement 300 that is transmitted to IGP nodes across the domains in response to, e.g., pre-configuration of the target node or extensions to the RSVP-TE signaling messages. As for the latter, the RSVP extensions may specify both the target node and an access control list that limits the propagated information to downstream prefixes. Extensions to RSVP-TE signaling messages are described in previously incorporated U.S. patent application Ser. No. 11/001,349.

Specifically, the target node, e.g., a border router (ABR or L1L2 router) performs a shortest path first (SPF) computation rooted at the target node to create a shortest path tree (SPT). Generally, the target node maintains a current SPT that may be used. The target node traverses the SPT to locate a sub-branch starting at the tail-end node and tags all address prefixes downstream from the tail-end node (i.e., away from the head-end node) with a value corresponding to a loopback address of the tail-end node. The target node then generates one or more IGP advertisements 300 containing these tagged prefixes encoded into the node-id sub-TLV 550b.

Illustratively, the node-id sub-TLV 550b contains an identifier of the tail-end node that "originates" the prefix (e.g., as specified in RFC 3784, incorporated by reference above). A tail-end node is said to originate a prefix when the prefix is located in the target node's SPT sub-branch (i.e., beyond the tail-end node in the target node's standard SPT). All prefixes of an area originated by the tail-end node are associated with the same node-id sub-TLV 500b. Notably, the node-id sub-TLV is additive, in the sense that it can appear more than once per prefix, thus allowing the same prefix to be identified as downstream to multiple tail-end nodes (from the standpoint of one or more border routers).

Upon receiving the advertisement with the node-id sub-TLV 550b, the head-end node calculates routes using its local reachability information, as well as the remote reachability information from the target node to create inter-domain reachability information. Prefixes that have been identified as "downstream" to a tail-end node are routed through the TE-LSP to that tail-end node. The head-end node assigns a metric to each address prefix obtained via the remote reachability information equal to the metric of the TE-LSP, as discovered by the RSVP TE signaling messages. Moreover, the head-end node generally computes its routing table 600 in the same manner as described above with reference to FIG. 6, with the exception that routing services 247 associates prefixes to target (tail-end) nodes for insertion into the shadow table 650, where the node-id sub-TLV 550b of the prefix contains a node-id that matches the tail-end node-id. Note that in this case, the shadow table does not hold any associated metrics. As a result, the next-hop interface and address are the same as that for the TE-LSP, and the associated cost with each prefix will be the cost of the TE-LSP (e.g., "4").

Figure 8:
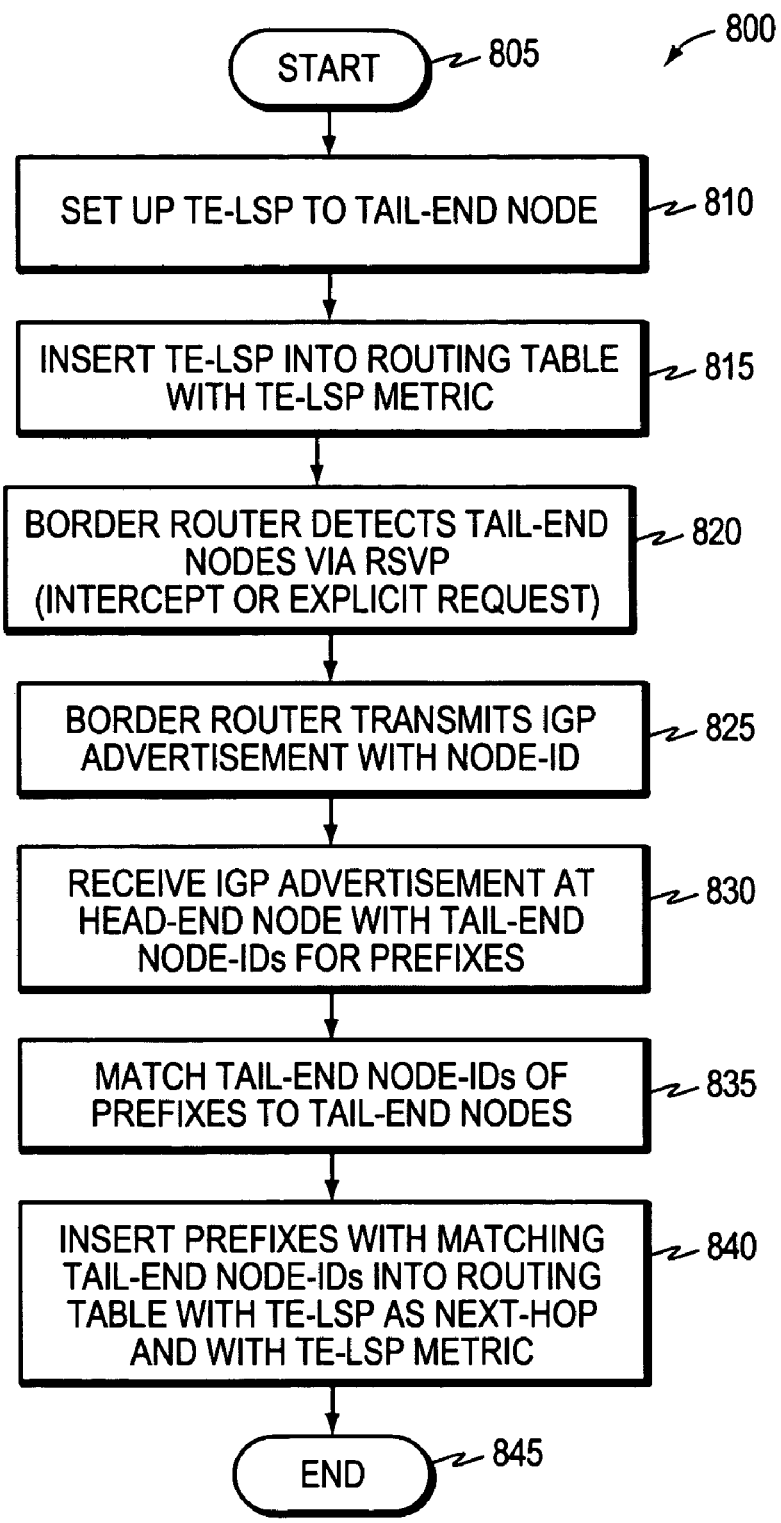
FIG. 8 is a flowchart illustrating a sequence of steps for propagating reachability information in accordance with the present invention.

FIG. 8 is a flowchart illustrating a sequence of steps for propagating reachability information in accordance with the present invention. The sequence 800 starts at step 805, and continues to step 810, where a TE-LSP is established (set up) from a head-end node to a tail-end node in accordance with the methods described above. In step 815, the head-end node inserts the TE-LSP into its routing table with a metric learned through RSVP TE. A target node (e.g., a border router, such as an ABR or L1L2 router), detects the presence of TE-LSP tail-end nodes within its area or level in step 820. Illustratively, a border router may detect tail-end nodes by intercepting RSVP TE messages between a head-end node and the tail-end node, or by receiving an explicit request to advertise the routing information of a particular tail-end node, such as by a RI-REQ TLV described in the previously incorporated U.S. patent application Ser. No. 11/001,349. The border router then transmits an IGP Advertisement 300 in step 825 with the novel tail-end node-id TLV 550b. Upon receiving the IGP Advertisement in step 830, the head-end node loads the node-id contents into the shadow table 650 and examines those contents to match the node-ids of the advertised prefixes to the node-id of known TE-LSP tail-end nodes in step 835. In step 840, the head-end inserts the prefixes with matching node-ids into its routing table 600. In this case, the prefixes are given a next-hop interface equal to the TE-LSP and a metric equal to (or substantially equal to) the TE-LSP metric. The sequence ends in step 845.

In accordance with still another aspect of the present invention, the target node is located along the TE-LSP and advertises all reachable address prefixes in its domain from the tail-end node using the node-id sub-TLV 550b along with a novel prefix-cost sub-TLV 550c. Here, the prefix-cost sub-TLV contains a metric (e.g., cost) of each prefix from the tail-end node (identified by the node-id sub-TLV) as computed by a node that does not originate the prefix, i.e., the target node. The prefix-cost sub-TLV is illustratively employed where the target node performs a special SPF computation rooted at the tail-end node to create a special SPT. The prefix-cost sub-TLV 550c is contained within the extended reachability TLV 500 of the IGP advertisement 300 that is transmitted to IGP nodes across the domains in response to, e.g., pre-configuration of the target node or extensions to the RSVP-TE signaling messages.

Illustratively, the prefix-cost sub-TLV 550c contains the metric (e.g., cost) to reach the prefix from the tail-end node as computed by the target node, which, in this case, is not the tail-end node. This metric is computed and stored in the target node's special SPT, and placed into the prefix-cost sub-TLV 550c for transmission in the IGP advertisement. Notably, the special metric only has significance for the head-end node of the TE-LSP. Also, the node-id sub-TLV and prefix-cost sub-TLV may be either a single combined sub-TLV, or a concatenation of two separate sub-TLVs.

Upon receiving these advertisements, the head-end node calculates routes using its local reachability information, as well as the remote reachability information from the target node to create inter-domain reachability information. Specifically, for each address prefix obtained via the IGP advertisement with the node-id and prefix-cost subTLVs, the head-end node assigns a metric to the prefix equal to the metric carried in the prefix-cost sub-TLV 550*c* (in addition to the TE-LSP metric).

Again, the head-end node generally computes its routing table in the same manner as described above with reference to FIG. 6, with the exception that routing services 247 associates prefixes to target (tail-end) nodes for insertion into the shadow table 650, where the node-id sub-TLVs 550*b* of the prefix contains a node-id that matches the tail-end node-id. In addition, however, the shadow table contains metrics (e.g., costs) associated with the prefixes, as obtained from the prefix-cost sub-TLV 550*c*. As a result, the next-hop interface and address are the same as that for the TE-LSP, and the associated cost with each prefix is the cost of the TE-LSP (e.g., "4") plus the additional prefix cost (e.g., "1"), to obtain the value "5".

Figure 9:
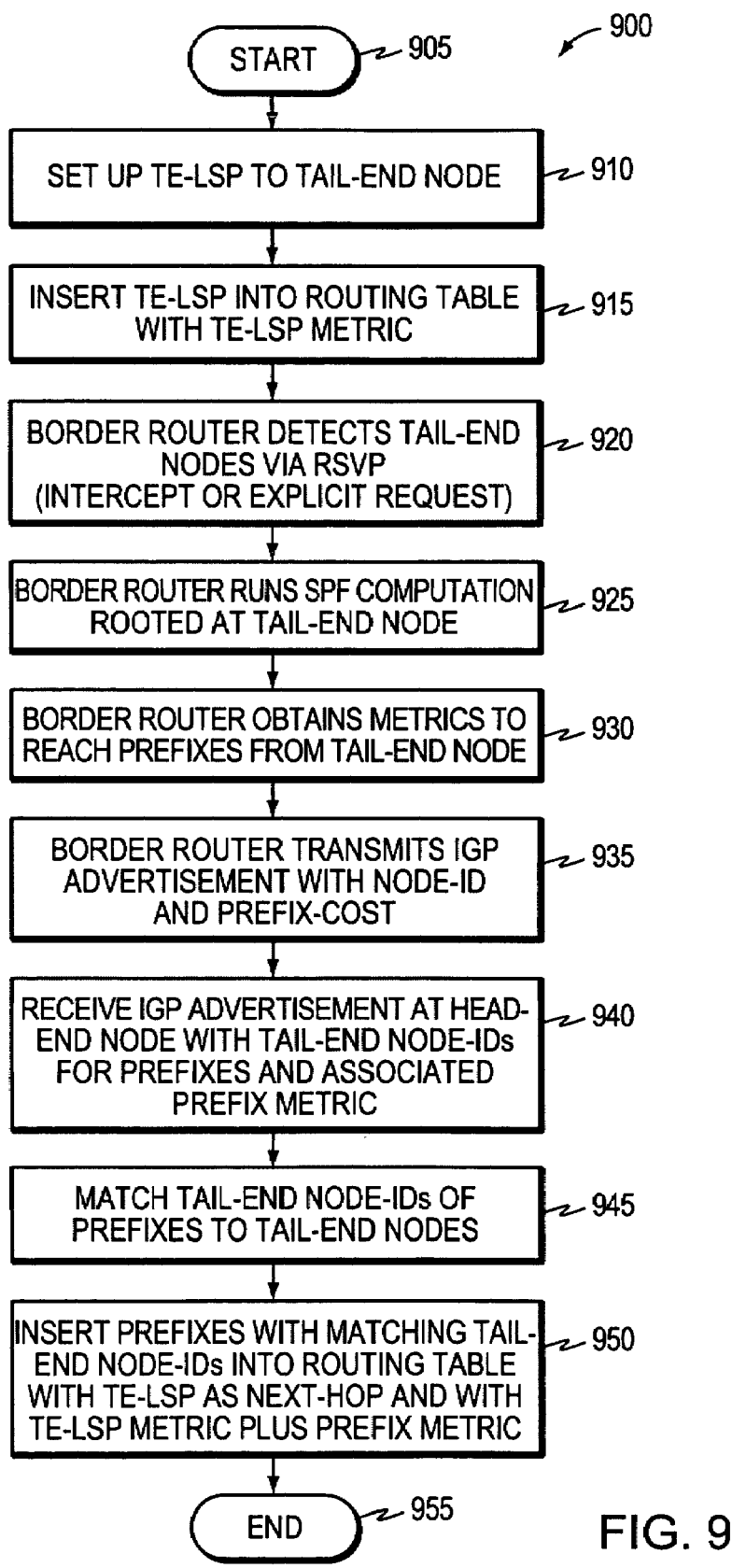
FIG. 9 is a flowchart illustrating a sequence of steps for propagating reachability information in accordance with the present invention.

FIG. 9 is a flowchart illustrating a sequence of steps for propagating reachability information in accordance with the present invention. The sequence 900 starts at step 905, and continues to step 910, where a TE-LSP is established (set up) from a head-end node to a tail-end node in accordance with the methods described above. In step 915, the head-end node inserts the TE-LSP into its routing table with a metric learned through RSVP TE. A target node (e.g., a border router, such as an ABR or L1L2 router), detects the presence of TE-LSP tail-end nodes within its area or level in step 920. Illustratively, a border router may detect tail-end nodes by intercepting RSVP TE messages between a head-end node and the tail-end node, or by receiving an explicit request to advertise the routing information of a particular tail-end node, such as by the RI-REQ TLV referenced above. In step 925, the border router performs an SPF computation rooted at the tail-end node, and in step 930, obtains the metrics to reach surrounding prefixes from the tail-end node for placement into the novel prefix-cost TLV 550*c*. The border router then transmits an IGP Advertisement 300 in step 935 with the novel tail-end node-id TLV 550*b* and novel prefix-cost TLV 550*c*. Upon receiving the IGP Advertisement in step 940, the head-end node loads the node-id and prefix-cost contents into the shadow table 650 and examines those contents to match the node-ids of the advertised prefixes to the node-id of known TE-LSP tail-end nodes in step 945. In step 950, the head-end inserts the prefixes with matching node-ids into its routing table 600. In this case, the prefixes are given a next-hop interface equal to the TE-LSP and a metric equal to (or substantially equal to) the TE-LSP metric plus the prefix metric contained in the associated prefix-cost TLV 550*c*. The sequence ends in step 955.

Advantageously, the novel technique propagates reachability information for a tail-end node of an established TE-LSP that spans multiple domains to a head-end node of the TE-LSP. By informing the head-end node of the reachability information for the tail-end node, the inventive technique provides an alternative to sub-optimal routing techniques, such as manual configuration (e.g., static routing or policy routing), that can avoid some of the risks and possible errors created in such sub-optimal routing techniques.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for propagating reachability information for a tail-end node of a traffic engineering (TE) label switched path (LSP) to a head-end node of the TE-LSP in a computer network, the TE-LSP spanning multiple domains of the network such that the tail-end node resides in a domain that is remote from the domain of the head-end node, the method comprising:

transmitting, via an Interior Gateway Protocol (IGP) advertisement, the reachability information from the target node residing in the domain of the tail-end node to the head-end node;

receiving, at the head-end node, the transmitted reachability information;

calculating, at the head-end node, routes reachable from the tail-end node using the received information; and inserting the calculated routes into a routing table of the head-end node.

2. The method of claim 1, further comprising: advertising a reachable address prefix from the target node using an area-identifier (area-id) data structure that identifies the domain to which each prefix belongs.

3. The method of claim 2, further comprising: transmitting an extended reachability object data structure within the IGP advertisement, the extended reachability object data structure containing the area-id data structure.

4. The method of claim 1, further comprising: advertising a reachable address prefix that is downstream from the tail-end node in its domain using a node-id data structure that identifies the tail-end node as originating the prefix.

5. The method of claim 4, further comprising: transmitting an extended reachability object data structure within the IGP advertisement across the domains, the extended reachability object data structure containing the node-id data structure.

6. The method of claim 5, further comprising: advertising a metric of each reachable address prefix from the tail-end node using a prefix-cost data structure that contains the metric as computed by a node that does not originate the prefix.

7. The method of claim 6, further comprising: transmitting the extended reachability object data structure within the IGP advertisement across the domains, the extended reachability object data structure containing the prefix-cost data structure.

8. The method of claim 1, further comprising: storing the received reachability information in a shadow routing table at the head-end node prior to calculating routes.

9. The method of claim 1, wherein the TE-LSP spans multiple areas.

10. A system for propagating reachability information for a tail-end node of a traffic engineering (TB) label switched path (LSP) to a head-end node of the TE-LSP in a computer network, the TE-LSP spanning multiple domains of the network such that the tail-end node resides in a domain that is remote from the domain of the head-end node, the system comprising:

an Interior Gateway Protocol (IGP) advertisement configured to carry the reachability information from a target node residing in a domain of the tail-end node to the head-end node;

a memory of the head-end node configured to store received reachability information;

a processor of the head-end node implementing a routing information base (RIB) to calculate routes reachable from the tail-end node using the received reachability information; and the memory of the head-end node further configured to maintain a routing table of the head-end node that stores the calculated routes.

11. The system of claim 10, further comprising: an area-identifier (area-id) data structure to advertise a reachable address prefix from the target node, wherein the area-id data structure identifies the domain to which each prefix belongs.

12. The system of claim 11, further comprising: an extended reachability object data structure within the IGP advertisement to transmit the area-id data structure.

13. The system of claim 10, further comprising: a node-id data structure to advertise a reachable address prefix that is downstream from the tail-end node in its domain, wherein the node-id data structure identifies the tail-end node as originating the prefix.

14. The system of claim 13, further comprising: an extended reachability object data structure within the IGP advertisement to transmit, across the domains, the node-id data structure.

15. The system of claim 10, further comprising: a prefix-cost data structure to advertise a metric of each reachable address prefix from the tail-end node, wherein the prefix-cost data structure contains the metric as computed by a node that does not originate the prefix.

16. The system of claim 15, further comprising: an extended reachability object data structure within the IGP advertisement to transmit, across the domains, the prefix-cost data structure.

17. The system of claim 10, further comprising: the memory of the head-end node further configured to maintain a shadow routing table that stores the received reachability information prior to use of the information in calculating routes.

18. An apparatus for propagating reachability information for a tail-end node of a traffic engineering (TE) label switched path (LSP) to a head-end node of the TE-LSP in a computer network, the TE-LSP spanning multiple domains of the network such that the tail-end node resides in a domain that is remote from the domain of the head-end node, the apparatus comprising:

means for transmitting, via an Interior Gateway Protocol (IGP) advertisement, the reachability information from the target node residing in the domain of the tail-end node to the head-end node;

means for receiving, at the head-end node, the transmitted reachability information;

means for calculating, at the head-end node, routes reachable from the tail-end node using the received information; and means for inserting the calculated routes into a routing table of the head-end node.

19. A computer readable medium containing executable program instructions for propagating reachability information for a tail-end node of a traffic engineering (TE) label switched path (LSP) to a head-end node of the TE-LSP in a computer network, the TE-LSP spanning multiple domains of the network such that the tail-end node resides in a domain that is remote from the domain of the head-end node, the executable program instructions comprising program instructions for:

transmitting, via an Interior Gateway Protocol (IGP) advertisement, the reachability information from the target node residing in the domain of the tail-end node to the head-end node;

receiving, at the head-end node, the transmitted reachability information;

calculating, at the head-end node, routes reachable from the tail-end node using the received information; and inserting the calculated routes into a routing table of the head-end node.

* * * * *

UNITED STATES PATENT AND TRADEMARK OFFICE
CERTIFICATE OF CORRECTION

PATENT NO. : 7,460,481 B2 Page 1 of 1
APPLICATION NO. : 11/001459
DATED : December 2, 2008
INVENTOR(S) : Jean-Philippe Vasseur et al.

It is certified that error appears in the above-identified patent and that said Letters Patent is hereby corrected as shown below:

Col. 16, Line 56, tail-end node of a traffic engineering (TB)(TE) label switched path Signed and Sealed this Twenty-eighth Day of September, 2010

David J. Kappos
*Director of the United States Patent and Trademark Office*